J. DE R. KIELLAND.
SCREW NUT GUARD.
APPLICATION FILED SEPT. 20, 1912.

1,161,317.

Patented Nov. 23, 1915.

Witnesses:
Chas. E. Whiteman
H. D. Penney

Inventor:
Jakob de Rytter Kielland,
By his Attorney, T. W. Richards.

UNITED STATES PATENT OFFICE.

JAKOB DE RYTTER KIELLAND, OF CHRISTIANIA, NORWAY, ASSIGNOR OF ONE-HALF TO ALBERT THODE, OF HAMBURG, GERMANY.

SCREW NUT-GUARD.

1,161,317. Specification of Letters Patent. Patented Nov. 23, 1915.

Application filed September 20, 1912. Serial No. 721,350.

*To all whom it may concern:*

Be it known that I, JAKOB DE RYTTER KIELLAND, engineer, a subject of the King of Norway, residing at Sporveisgatan 8, Christiania, Kingdom of Norway, have invented certain new and useful Improvements in or Relating to Screw Nut-Guards, of which the following is a specification.

The object of the present invention is to provide an absolutely reliable, cheap and easily manipulated screw nut-guard, which may be used everywhere and which may be also employed as a self-locking nut.

The nut-guard according to the present invention consists of a preferably hexagonal thin plate made of steel or another suitable material, with a hole punched through its center. The edge of said hole forms a spiral line when in the same plane, but is bent up in such a manner that it forms a helical line which will in diameter and pitch correspond exactly with the bottom line of the screw thread on the bolt, on to which the guard is to be screwed. The projection of this helical line will therefore be a circle the diameter of which is equal to the diameter of the bolt at the bottom of the thread. The edge of the hole is divided by radial notches into a plurality of sections which when screwed into the thread of the bolt will act as locking teeth. These locking teeth and the plate itself are preferably given a certain degree of spring. A combination of several such plates will form a nut.

Figure 1:
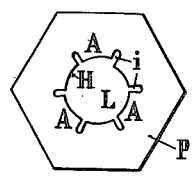
Figure 2:
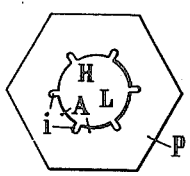
Figure 3:
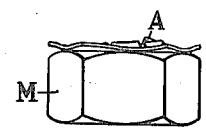
Figure 4:
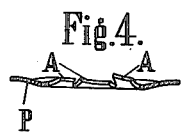
Figure 5:
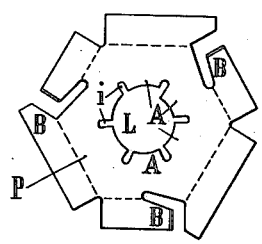
Figure 6:
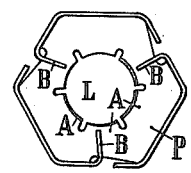
Figure 8:
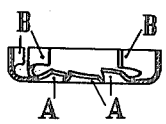
Figure 9:
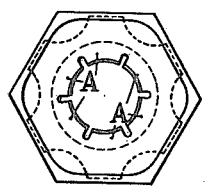
Figure 7:
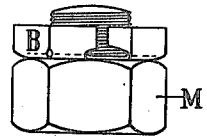
Figure 10:
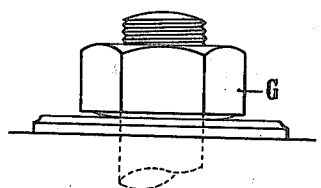
Figure 11:
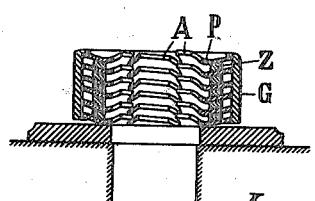

In the accompanying drawings three constructional forms of the present invention are exemplified. The most simple constructional form is that shown in Figures 1 to 4; of these Fig. 1 is a top view of the guard plate after the hole has been punched; Fig. 2 is the same view of the plate after the edge of the hole has been bent up according to the pitch of the thread, for instance after it has been screwed on to a bolt, the bolt not being shown; Fig. 3 shows the guard plate secured to a nut, the bolt being likewise omitted, and Fig. 4 is a cross section through the guard plate. In Figs. 5 to 8 another constructional form is shown. Here Fig. 5 is the punched plate; Fig. 6 is the plate bent up in the suitable manner, Fig. 8 is a cross section through Fig. 6 and Fig. 7 shows a guard plate of this kind on a nut, the bolt being here also shown. Figs. 9 to 11 show a top view, side view and cross section of a self-locking nut composed of a plurality of such plates.

The guard, Fig. 1, consists of a preferably hexagonal steel plate P, in which a hole L is punched. The edge H of this hole which contains a number of radial notches $i$, has the shape of a spiral line, the shape of which depends on the diameter and the pitch of the screw bolt, on which the guard is to be used. This spiral line will namely correspond to the curve which is obtained by plotting and its length will equal the length of the bottom line of one turn of the thread into a plane. When the guard plate according to Fig. 1 is screwed on a bolt, the integral portions of the edge of said hole will force deep into the bottom of the thread and will thus form a turn of the same thread which seen in a vertical projection will correspond to the shape of the hole shown in Fig. 2. Here the edge H of the hole forms a circle, the diameter of which is equal to the diameter of the bottom of the thread on the bolt. The teeth A projecting between the notches $i$ in the edge of said hole L will press tightly into the thread and when the plate is screwed down tightly, they will act like locking teeth, which will prevent the guard from getting loose. That is to say, when the perforated plate P is buckled, the spiral margin of its hole L will be converted into a helix or internal screw thread, interrupted by the notches $i$; and when it is forced upon the thread of its bolt, the integral portions of said margin will fit and be strongly pressed against the root of the bolt thread and, in consonance with the laws governing the elastic reactions of metals, will slightly compress those portions of the bolt with which they are in contact, which movement of the molecules of the bolt will cause an engagement between the said bolt and nut-lock, of such a nature as to resist all known vibratory and nut-loosening forces. Thus the plate L is itself locked and locks the nut to the bolt through the increased friction and at the same time permits removal of the nut-lock L should circumstances require the removal of the nut.

It is also advisable to bend up the plate P at its outside edges as well, as shown in Figs. 3 and 4, so as to give it a certain degree of spring. This gives the plate a greater stiffness and at the same time the gripping of the plate with the screw wrench is facilitated, while its bearing surface in contact with the nut (M in Fig. 3) is smaller, so that it can be more easily loosened by hand when desirable.

With the constructional form shown in Figs. 5 to 8 the guard plate has besides the inward elastic teeth punched out of the spiral line, also elastic tongues B on the outside edge. Fig. 5 shows the plate immediately after it has been punched out. These outer tongues A are subsequently bent upward and inward toward the screw bolt, extending in a radial direction, as shown in Figs. 6 to 8. The sharp edges of these hardened tongues will then bear against the thread of the bolt in a direction contrary to that in which the guard is tightened and will also prevent the guard from accidentally getting loose. These outside tongues will under certain conditions greatly improve the effect of the guard according to Figs. 1 to 4. Of course the guard would also be effective if it were provided with the outer tongues B only.

According to Figs. 9 to 11 a more or less large number of such plate guards according to Figs. 1 to 4 are placed on each other at a distance equal to the pitch of the thread and pressed into a common nut-like case G. Thereby a self-locking nut is obtained, which has a practically elastic female thread. The distance at which the guard plates are arranged, may be either equal to the single pitch of the thread or only every second or third turn of the thread is utilized, and so on, by intermediate packings Z of a suitable thickness being employed, which must of course have the necessary strength.

The effect of all the constructional forms of the guard hereinbefore described depend on the great moment compared to the small mass of the plate or ring, with which the spring locking teeth are obliged to press against the screw thread when the guard is tightened against a backing. It is further essential that all spring teeth engage simultaneously in the thread. The elastic pressure against the backing is of a further advantage.

It may be here mentioned that screw guards have already been suggested, which consisted of an elastic plate having a circular bore and intended to be screwed on the screw bolt. The present invention differs from these known guards, which all showed constructional defects and have not found any extensive use in practice, above all in that the hole is punched in such a manner that its edge forms an interrupted helix or female screw thread whose integral portions fit and are in elastic co-action with the bottom of the bolt thread, the teeth formed by said interrupted helix engaging with the root of the thread of the bolt with increasing friction, said frictional engagement with the root of the thread being in direct ratio to the force with which the nut lock L is screwed down on the nut.

What I claim as my invention and pray to secure by Letters-Patent is:—

1. A nut lock comprising a metal plate having a bolt hole comprising a straight portion that is substantially radial to the center of the bolt hole and a single spiral convolution starting and terminating at said straight portion, there being a plurality of substantially radial notches in said plate extending inwardly from said bolt hole, said notches being progressively one longer than the other, the shortest notch being disposed at said straight portion and the continuation of said straight portion forming one side of said shortest notch, and the longest notch being disposed adjacent to said shortest notch, said notches forming a plurality of broad teeth in said plate extending toward an imaginary line centrally of said bolt hole, said teeth being progressively one longer than the other, the shortest tooth and the longest tooth being disposed adjacent to one another, the teeth being disposed in a helical path with the shortest tooth at one end of the helical path and the longest tooth at the other end of such helical path, and the teeth being each bent at a different angle to a certain plane, that is, beginning with the next to the shortest tooth, the teeth are each bent at an angle one progressively greater than the angle of its preceding tooth so that all the active edges of the teeth will terminate in an imaginary cylindrical surface, the entire broad active edges of the teeth forming a spiro-helical line only interrupted by said notches.

2. A nut lock comprising a disk of elastic metal having a bolt hole therein, a plurality of teeth in said disk extending toward an imaginary line centrally of said bolt hole, said teeth being progressively one longer than the other, the shortest tooth and the longest tooth being disposed adjacent to one another, the teeth being bent at different angles to a certain plane that is, beginning with the next to the shortest tooth, the teeth are each bent at an angle one progressively greater than the angle of its preceding tooth so that all the inner edges of the teeth will terminate in an imaginary cylindrical surface, and flanges on the outer edges of said disk, portions of said flanges extending radially inward to form stiffening means for the disk.

In witness whereof I have hereunto signed my name this 6 day of September, 1912, in the presence of two subscribing witnesses.

JAKOB DE RYTTER KIELLAND.

Witnesses:
   M. GUTTODUSKY,
   SIGM. BÖE.